US008309189B2

(12) United States Patent
Suzuki et al.

(10) Patent No.: US 8,309,189 B2
(45) Date of Patent: Nov. 13, 2012

(54) MULTILAYERED LIQUID CONTAINER

(75) Inventors: Toyoaki Suzuki, Tokyo (JP); Koichi Miura, Tokyo (JP); Atsushi Mio, Tokyo (JP)

(73) Assignee: Fujimori Kogyo Co., Ltd., Tokyo (JP)

( * ) Notice: Subject to any disclaimer, the term of this patent is extended or adjusted under 35 U.S.C. 154(b) by 129 days.

(21) Appl. No.: 13/057,439

(22) PCT Filed: Jul. 27, 2009

(86) PCT No.: PCT/JP2009/063333
§ 371 (c)(1),
(2), (4) Date: Feb. 3, 2011

(87) PCT Pub. No.: WO2010/016404
PCT Pub. Date: Feb. 11, 2010

(65) Prior Publication Data
US 2011/0135223 A1     Jun. 9, 2011

(30) Foreign Application Priority Data
Aug. 5, 2008  (JP) .................................. 2008-201730

(51) Int. Cl.
*B29D 22/00* (2006.01)
(52) U.S. Cl. ......................... 428/35.7; 283/114; 604/408
(58) Field of Classification Search .................. 428/35.7; 383/114; 604/408
See application file for complete search history.

(56) References Cited

U.S. PATENT DOCUMENTS

| | | | |
|---|---|---|---|
| 7,976,526 B2* | 7/2011 | Kitagawa et al. | 604/408 |
| 7,976,918 B2* | 7/2011 | Uesugi et al. | 428/35.7 |
| 2002/0079241 A1 | 6/2002 | Matsuo et al. | |
| 2002/0197478 A1* | 12/2002 | Muggli et al. | 428/411.1 |
| 2003/0215659 A1* | 11/2003 | Farley et al. | 428/500 |
| 2006/0035044 A1 | 2/2006 | Omori et al. | |
| 2006/0163446 A1* | 7/2006 | Guyer et al. | 250/203.1 |
| 2006/0198973 A1* | 9/2006 | Jester | 428/35.7 |
| 2008/0033390 A1* | 2/2008 | Kitagawa et al. | 604/408 |
| 2010/0076396 A1* | 3/2010 | Takahashi et al. | 604/408 |

(Continued)

FOREIGN PATENT DOCUMENTS
EP      1 757 531 A1     2/2007

(Continued)

OTHER PUBLICATIONS

Extended European Search Report issued Mar. 6, 2012, in European Patent Application No. 09804888.7.

(Continued)

*Primary Examiner* — N. Edwards
(74) *Attorney, Agent, or Firm* — Birch, Stewart, Kolasch & Birch, LLP (57) ABSTRACT

A multilayered liquid container having a discharge port welded under specified conditions to a sealant, which is constituted of a resin comprising a cycloolefin resin as a main component. The discharge port is composed of: an innermost layer constituted of a resin comprising a cycloolefin as a main component; and a surface layer whose main part is constituted of a resin comprising a specific type of polyethylene as a main component. According to the present invention, there can be provided a multilayered liquid container, which can prevent an effective component of a content fluid from being adsorbed onto or penetrating through not only the container body, but also the resin constituting the discharge port, and enables high temperature sterilization treatment, coupled with the discharge port having high welded strength and drop strength.

11 Claims, 3 Drawing Sheets

EXAMPLE 2
Ⅰ=10mm, Ⅱ=6mm, Ⅲ=4mm

U.S. PATENT DOCUMENTS

| | | | |
|---|---|---|---|
| 2010/0163446 A1* | 7/2010 | Suzuki et al. | 206/438 |
| 2011/0135223 A1* | 6/2011 | Suzuki et al. | 383/114 |
| 2011/0266184 A1* | 11/2011 | Suzuki et al. | 206/524.1 |
| 2012/0164465 A1* | 6/2012 | Takahashi et al. | 428/476.9 |
| 2012/0171398 A1* | 7/2012 | Takahashi et al. | 428/35.5 |

FOREIGN PATENT DOCUMENTS

| | | |
|---|---|---|
| JP | 2000-84044 A | 3/2000 |
| JP | 2002-255200 A | 9/2002 |
| JP | 2004-298220 A | 10/2004 |
| JP | 2005-254508 A | 9/2005 |
| JP | 2006-81898 A | 3/2006 |
| JP | 4060222 B2 | 3/2007 |
| JP | 2007-253961 A | 10/2007 |
| JP | 2007-261630 A | 10/2007 |
| JP | 4004650 B2 | 11/2007 |
| JP | 2008-18063 A | 1/2008 |
| JP | 2008-29829 A | 2/2008 |
| JP | 2009-13285 A | 1/2009 |

OTHER PUBLICATIONS

International Search Report for PCT/JP2009/063333, dated Nov. 2, 2009.

* cited by examiner

EXAMPLE 1, 3, 5, 6, 7
I=10mm, II=9mm, III=1mm

FIG.3

EXAMPLE 2
I=10mm, II=6mm, III=4mm

EXAMPLE 4
I=10mm, II=9mm, III=1mm

EXAMPLE 8
I=10mm, II=7mm, III=3mm

MULTILAYERED LIQUID CONTAINER

TECHNICAL FIELD

This invention relates to a multilayered liquid container having a discharge port and constituted of resins. More particularly, the present invention relates to a multilayered liquid container wherein an effective component of a content fluid is prevented from adsorption on or penetration through not only a container body, but also resins constituting the discharge port, the container can be subjected to high-temperature sterilization treatment, and the discharge port has high weld strength and drop strength.

BACKGROUND ART

In recent years, there have been developed, as a preparation for intravenous drip, soft bag preparations wherein a medicine for injection is preliminarily diluted and filled in a flexible container such as plastics. The soft bag preparation has been accepted as being useful because of its excellence in disposability over glass bottles and ampules along with the convenience and readiness in use.

It is known, however, that part of medicines including nitro glycerine, protein-containing preparations such as albumin, hormone and the like, a hyaluronic acid preparation, preparations of vitamins, trace elements, insulin, anticancer agents, radical scavengers and the like adsorb on or penetrate into base materials for medical container including ordinary polyolefin resins (PO resins) polyethylene (PE), polypropylene (PP) and the like, and vinyl chloride resin. Hence, effective components in a content fluid may be adsorbed, or interactions between additives or low-molecular-weight components present in the base material and the content fluid may occur, thereby presenting a problem on the development of soft bag preparation.

From this point of view, there is proposed, as described, for example, in JP-A 2004-298220 (Patent Document 1), the use of cycloolefin resins (COP resins) as a resin that is free of medicinal adsorption or penetration.

In JP-A 2008-29829 (Patent Document 2), application and development of COP resins, which have been hitherto used as a prefilled syringe container, to soft bags is disclosed.

This container makes use of a polyethylene resin (PE resin) as an innermost layer, for which while increasing drop impact strength as a container and keeping satisfactory strength for use as a liquid storage container, certain effects of preventing the component adsorption and the interaction with a content fluid have been recognized. In this connection, however, because of the polyethylene resin used as innermost layer, the effects of preventing the component adsorption and the interaction with a content fluid are worse than with the case using conventional glass containers, thereby not leading to satisfactory dissolution of the problem.

COP resins are greater in molecular weight than low-density polyethylene and the like, are more linear and have a bulky molecular structure based on the cyclic hydrocarbon group in the molecular structure, so that limitation is placed on the thermal motion of the molecular main chain. As a consequence, where formed as a film, the resin is liable to provide a hard, brittle film. Accordingly, for use as a base material film of soft bag, usual practice is to laminate this with a flexible PO resin such as a PE resin.

For instance, in JP-A 2005-254508 (Patent Document 3), there is disclosed a packaging pouch made of a laminated film having a PO resin as an outer layer and a COP resin as an inner layer. It is stated that because high pressure steam sterilization treatment is possible and component adsorption can be suppressed, the pouch is adapted for use for injection preparations that are liable to be adsorbed.

In JP-A 2006-081898 (Patent Document 4), there is described a soft bag wherein a layer made of a COP resin or a resin containing a COP resin and a layer of a polyester resin or PO resin are laminated.

Incidentally, it has been accepted from the standpoint of component adsorptivity that soft bags making use of these multilayered films are beneficial when using a COP resin layer as an innermost layer. On the other hand, these soft bags are usually provided with a discharge port (port) for discharging a medicinal solution. With respect to a discharge port member, it is considered in view of weldability with a COP resin of an innermost layer of bag that it is necessary to use a discharge port member formed likewise of a COP resin.

However, when forming the discharge port member made only of a COP resin, which is much more expensive than PO resins, an amount of the resin used becomes great, resulting in poor economy. As stated hereinbefore, the COP resin per se is hard and brittle, so although the mutually welded portion of COP resin members is high in weld strength, it is brittle against impact and flexion, with the attendant problem that when dropped, such a discharge port is liable to suffer breakage therearound. Moreover, when a cap for covering a rubber stopper is welded so as to prevent the rubber stopper from coming off, a problem has also been involved in the cost of the cap and the brittleness at the welded portion. Where the cap per se made of COP is dropped, the impact is concentrated at the cap portion, leading to the high possibility of breakage. Accordingly, there has been demanded the development of a soft bag that is free of medicine adsorption and penetration and is unlikely to suffer breakage when subjected to impact such as dropping.

With respect to the brittleness of the discharge port per se, it is described in JP-A 2005-254508 (Patent Document 3) that flexibility is imparted by formulating a thermoplastic elastomer in a COP resin. In this JP-A 2005-254508 (Patent Document 3), it is stated that there may be used a double molded port making use of a COP resin as an innermost layer and linear low-density polyethylene (LLDPE) as an outermost layer. However, resin properties and the manner of welding are not particularly disclosed at all. Especially, with respect to the manner of welding between a film and a discharge port, no use is made of a double molded port in the examples and the weld strength of the film and the discharge port is not specifically disclosed.

In JP-A 2008-18063 (Patent Document 5), it is stated that an innermost layer of a film for container may be constituted of a COP resin and a discharge port used may be constituted of LLDPE prepared by use of a single site catalyst, a COP resin or a multilayer thereof. However, in a weld strength test, only the weld strength of films at a peripheral portion of a container is disclosed, and no disclosure is made on the weld strength between the film and the discharge port.

PRIOR-ART DOCUMENTS

Patent Documents

Patent Document 1: JP-A 2004-298220
Patent Document 2: JP-A 2008-29829
Patent Document 3: JP-A 2005-254508
Patent Document 4: JP-A 2006-081898

Patent Document 5: JP-A 2008-18063

DISCLOSURE OF THE INVENTION

Problems to be Solved by the Invention

The present invention has been made under such circumstances as set out above and has for its object the provision of a multilayered liquid container, which is able to prevent effective components of a content fluid from adsorption on or penetration into not only a container body, but also resin constituents for discharge port and can be subjected to high temperature sterilization treatment and which has a discharge port having high weld strength and drop strength.

Means for Solving the Problems

In order to achieve the above object, the inventors of the present invention have made intensive studies and, as a result, found that a multilayered liquid container, which has a discharge port including an innermost layer constituted of a resin including a cycloolefin resin as a main component and a surface layer whose main part is constituted of a resin including a specific polyethylene as a main component, the discharge port being welded with a sealant composed of a resin including a cycloolefin resin as a main component under specified conditions, is able to prevent effective components of a content fluid from adsorption on and penetration into not only a container body, but also the resins constituting the discharge port, can be subjected to high temperature sterilization treatment, and has high weld strength and drop strength of the discharge port. The present invention has been achieved in this way.

Specifically, the present invention provides the following multilayered liquid container.

Claim 1:

A multilayered liquid container, which is made of a multilayered film wherein a sealant of a resin including a cycloolefin resin as a main component is laminated on one side thereof and has, at a part of the container, at least one discharge port having a laminate structure at a section intersecting with a discharge path at a right angle, characterized in that:

an innermost layer forming the discharge path of the discharge port is constituted of a resin including a cycloolefin resin as a main component, and a main part of a surface layer is constituted of a resin including, as a main component, polyethylene polymerized by use of a metallocene catalyst; and in a welded portion wherein the discharge port is welded with the sealant, a part of the resin including the cycloolefin resin as a main component in the innermost layer of the discharge port is exposed at the surface layer of the discharge port in the form of a band along an end edge of the multilayered film and both at least a part of the resin left as a subordinate part of the surface layer and comprising the cycloolefin resin as a main component and the resin left as a main part of the surface layer and comprising, as a main component, the polyethylene polymerized by use of the metallocene catalyst are welded with the sealant in the form of a band.

Claim 2:

The multilayered liquid container as recited in claim 1, characterized in that the resin including, as a main component, the polyethylene polymerized by use of the metallocene catalyst is absent at the surface layer existing at an end portion of the welded portion side of the discharge port.

Claim 3:

The multilayered liquid container as recited in claim 1 or 2, wherein in the welded portion, a ratio between a welded width of the resin including, as a main component, the polyethylene polymerized by use of the metallocene catalyst and a welded width of the resin composed mainly of the cycloolefin resin is at 95:5 to 5:95.

Claim 4:

The multilayered liquid container as recited in any one of claims 1 to 3, characterized in that the polyethylene polymerized by use of the metallocene catalyst is a linear polyethylene whose density is at 880 to 970 kg/m$^3$.

Claim 5:

The multilayered liquid container as recited in any one of claims 1 to 4, characterized in that the resin used for the discharge port and including, as a main component, the polyethylene polymerized by use of the metallocene catalyst is made singly of the polyethylene polymerized by use of the metallocene catalyst or is made of a mixture of the polyethylene polymerized by use of the metallocene catalyst and a cycloolefin resin, a medium density polyethylene or a high density polyethylene.

Claim 6:

The multilayered liquid container as recited in claim 5, characterized in that the resin used for the discharge port and including, as a main component, the polyethylene polymerized by use of the metallocene catalyst contains a high density polyethylene having a density of 935 to 970 kg/m$^3$ within a range of not larger than 40 wt %.

Claim 7:

The multilayered liquid container as recited in any one of claims 1 to 6, characterized in that in the resin used as the innermost layer of the discharge port and including, as a main component, the cycloolefin resin, a content of a resin component whose number average molecular weight in polystyrene conversion is not larger than 3,000 is at not larger than 1 wt % when determined by gel permeation chromatography using toluene as a solvent.

Claim 8:

The multilayered liquid container as recited in any one of claims 1 to 7, wherein the cycloolefin resin in the resin including, as a main component, the cycloolefin resin and used for the innermost layer of the discharge port is represented by the following general formula (1) and/or (2)

[Chemical Formula 1]

(wherein R$^1$, R$^2$, R$^3$ and R$^4$ each are a same or different organic group having 1 to 20 carbon atoms, and R$^1$ and R$^2$ and/or R$^3$ and R$^4$ may mutually form a ring, m and p each are an integer of 0, 1 or over, and l and n each are an integer of 1 or over).

Claim 9:
The multilayered liquid container as recited in any one of claims 1 to 8, wherein in the laminate structure of the discharge port, recess and/or projection portions are formed on the resin layer including, as a main component, the cycloolefin resin at the side of the resin layer including, as a main component, the polyethylene polymerized by use of the metallocene catalyst.

Claim 10:
The multilayered liquid container as recited in any one of claims 1 to 9, wherein a cap provided with a rubber stopper is welded to the discharge port.

Claim 11:
The multilayered liquid container as recited in any one of claims 1 to 10, wherein the container enables high-temperature sterilization treatment of not lower than 105° C.

Advantageous Effects of the Invention

According to the present invention, there is provided a multilayered liquid container, which can prevent an effective component of a content fluid from adsorption on and penetration into not only a container body, but also resin constituents of a discharge port, enables high temperature sterilization treatment. Also according to the present invention, there is provided further a multilayered liquid container having high weld strength and drop strength of the discharge port since two types of welded portions exist in the discharge port.

BRIEF DESCRIPTION OF DRAWINGS

[FIG. 1]
[FIG. 2]
[FIG. 3]
[FIG. 4]
[FIG. 5]

EMBODIMENT FOR CARRYING OUT THE INVENTION

Figure 1:
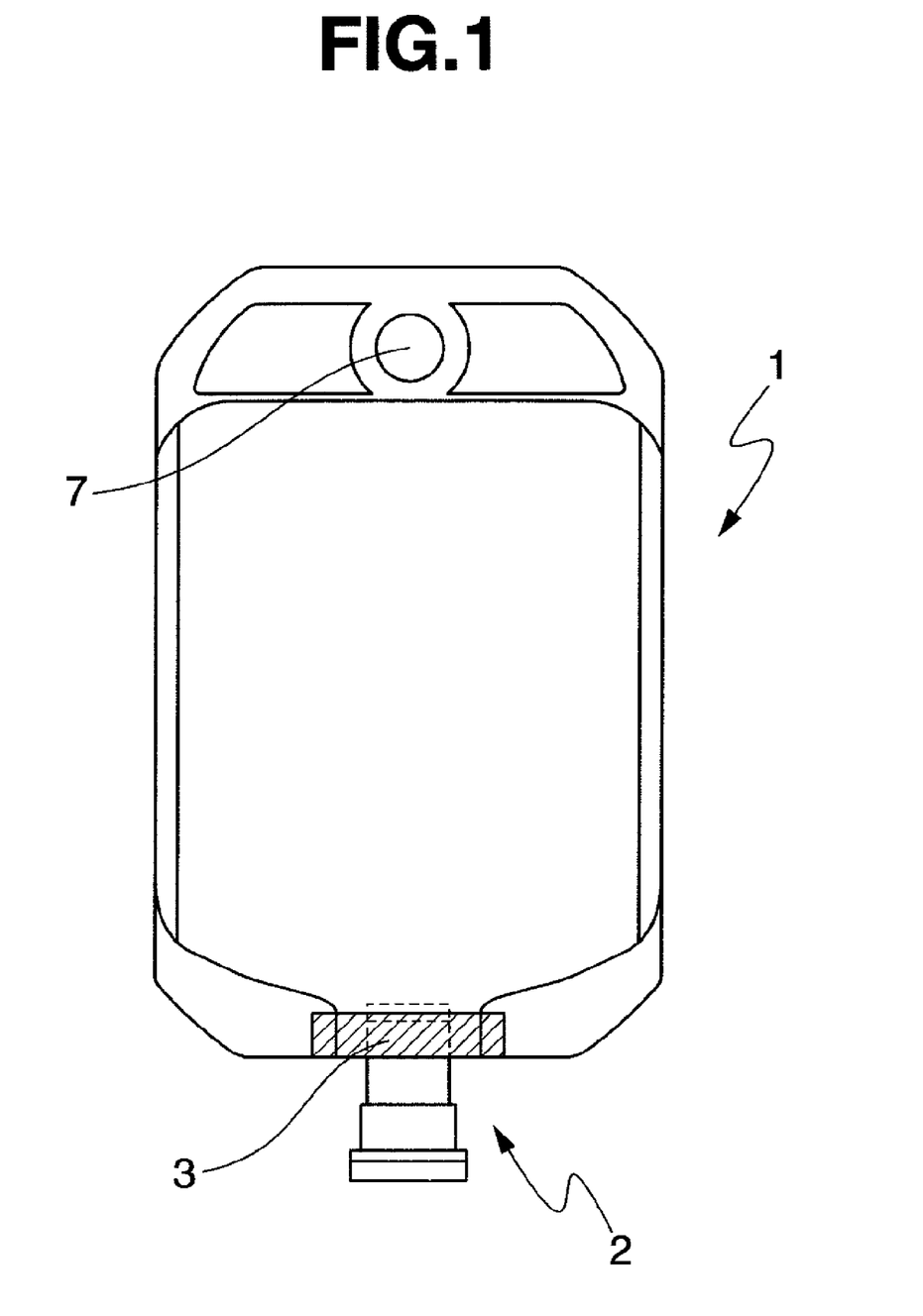
FIG. 1 is a plan view of a multilayered liquid container of the present invention.
Figure 2:
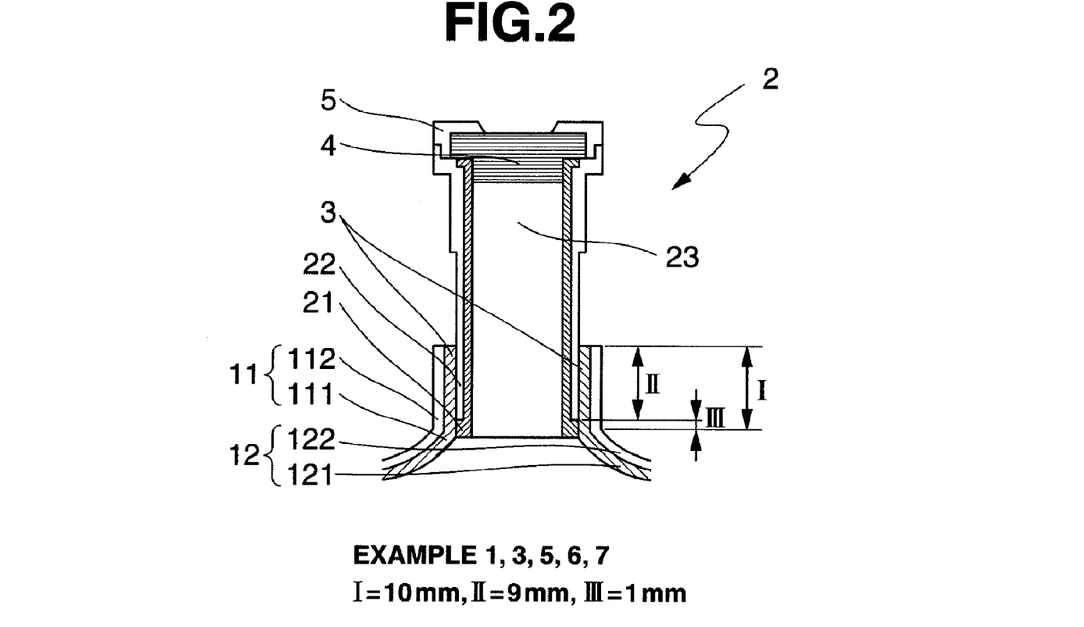
FIG. 2 is a sectional view of the vicinity of a discharge port according to a first embodiment of a multilayered liquid container of the present invention.
Figure 3:
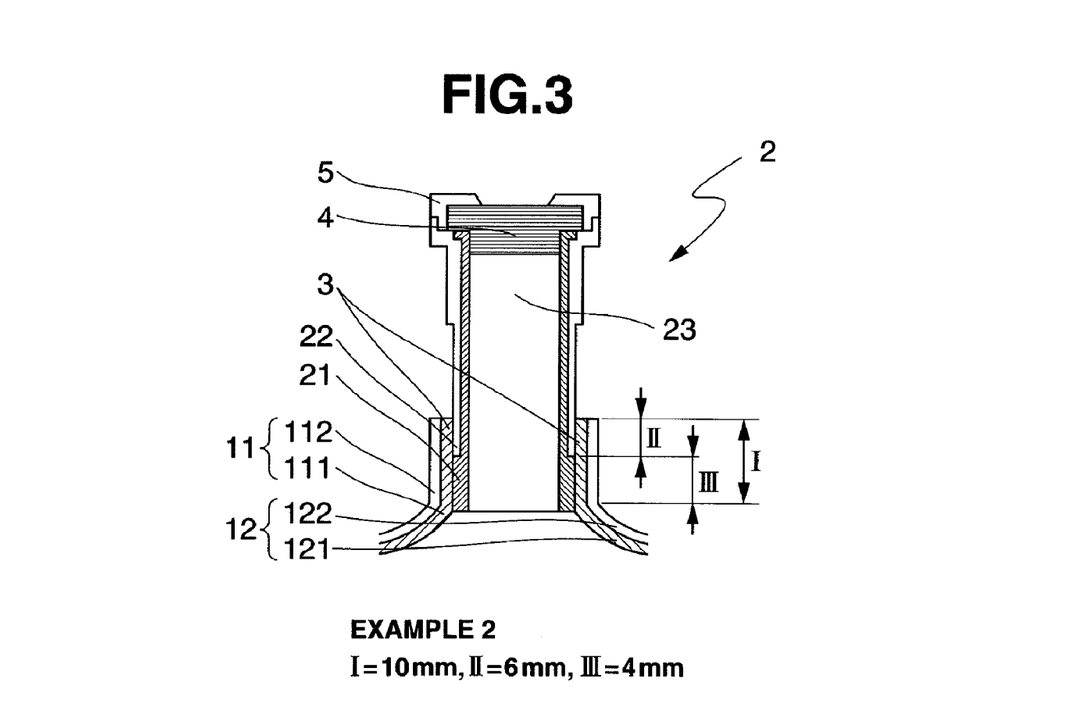
FIG. 3 is a sectional view of the vicinity of a discharge port according to another example of the first embodiment of a multilayered liquid container of the present invention.

The present invention is described in more detail with reference to the drawings.
FIG. 1 is a plan view of a multilayered liquid container 1 of the invention.
FIGS. 2 and 3 are, respectively, a sectional view of the vicinity of a discharge port according to a first embodiment of the multilayered liquid container of the invention.
A multilayered liquid container 1 of the invention is a bag-shaped container obtained by welding a periphery of a film or tube, or a blow-molded container, which has at least one discharge port 2 welded thereto.
It will be noted that in the present specification, a film and a sheet are both called film without making a distinction therebetween. Moreover, the "main component" means a component contained at not less than 50 wt %.

When the multilayered liquid container 1 is a bag-shaped container, multilayered films 11, 12 of the multilayered liquid container 1, respectively, have sealant 111, 121, both of which are constituted of a COP resin as a main component. And other types of resin layers made of such component as PO resin and so on are typically laminated at the outside in order to secure flexibility. Nonetheless, even other types of resin layers described hereinafter may be further laminated. The multilayered films 11, 12 may be the same or different. Although the sealant 111, 121 may be the same or different, it is preferred from the standpoint of welding that they are constituted of a resin made mainly of the same COP resin.

For the lamination of the multilayered films 11, 12, there can be adopted a known method of making an ordinary container. Such lamination is possible by use, for example, of a coextrusion molding such as a multilayer inflation molding, a multilayer T-die cast molding or the like, alternatively a laminate process such as an extrusion lamination wherein molten resins are directly laminated, a dry lamination making use of an adhesive or the like.

When a COP resin and a PO resin are laminated according to a coextrusion molding process, they may be directly laminated, or besides, an adhesive resin, typical of which is Adomer made by Mitsui Chemical Inc., Modic made by Mitsubishi Chemical Corporation or the like, may be used.

As the PO resin, conventionally known high density polyethylene (HDPE), linear low density polyethylene (LLDPE), medium density polyethylene (MDPE), polypropylene (PP) and blends thereof with thermoplastic elastomers are listed. The use of these PO resins enables the resulting container to be imparted with both a heat resistance and flexibility.

The total thickness of the multilayered films 11, 12 are not limited and is generally at 70 to 400 μm.

In this case, the thickness of the sealants 111, 121 using a COP resin as a main component is at 15 to 150 preferably at 50 to 100 μm. If the thickness of the sealants 111, 121 is smaller than 15 μm, weld strength with the discharge port 2 may not be satisfactory. In addition, when welding the discharge port, the sealants 111, 121 may become thinned by application of heat and compression pressure thereto, thereby causing a pinhole leak. Although the thickness of the sealants 111, 121 may exceed 150 μm, excessive thickness may degrade flexibility of the resulting container, and is unfavorable in view of cost.

As other type of resin layer used in place of the PO resin layer or for lamination along with the PO resin layer, there may be laminated a base film such as an oriented film for ensuring strength or a layer capable of imparting barrier properties.

The layer capable of imparting barrier properties such as oxygen barrier properties or water vapor barrier properties includes those layers of resins such as ethylene-vinyl alcohol copolymer, polyvinyl alcohol or a coated film thereof, MXD nylon, polyvinylidene chloride or a coated film thereof, fluorine-based films, alumina-deposited polyesters or nylons, silica-deposited polyesters or nylons and the like.

The multilayered films 11, 12 are welded at necessary portions thereof by known means to form a peripheral portion and welded with the discharge port 2 to provide the multilayered liquid container 1.

The welding is usually carried out by heat sealing and may be performed by ultrasonic sealing or high frequency sealing. The multilayered films 11, 12 may be formed as bulged according to vacuum molding or compressed air molding.

In case where the multilayered liquid container is a blow molded container, multilayer extrusion blow molding is favorably adopted, for example. In the multilayer coextrusion blow molding, a multilayer extruding machine having a plurality of extruders is used wherein a COP resin and a PO resin and, if necessary, an adhesive resin or other type of synthetic resin are molten in the respective extruders and extruded, followed by blow molding while blowing air. For the blow molding, a preform may be once formed and subsequently subjected to blow molding. Alternatively, direct blow molding may be performed in such a way that the respective molten resin layers are converted to a multilayered tubular parison inside a multilayered parison molding die and subjected to blow molding.

In the practice of the present invention, at least one discharge port 2 is provided at part of the multilayered liquid container 1. The discharge port 2 may also serve as a charge port.

As to the method of welding the discharge port 2, when the multilayered liquid container 1 is a bag-shaped container, the discharge port 2 is welded by superposing the sealants 111, 121 of the respective multilayered films 11, 12, inserting the discharge port 2 therebetween and welding by heat sealing.

When the multilayered liquid container is a blow molding, the discharge port 2 is welded in the course of the molding of the multilayered liquid container 1 by insert molding wherein the discharge port 2 is inserted into a mold during the molding. Alternatively, a multilayered container having an opening may be molded, followed by inserting the discharge port 2 into the opening and welding by heat sealing.

The discharge port 2 in the present invention is such that an innermost layer 21, which is in contact with a liquid as a discharge path, is constituted of a resin containing a COP resin as a main component in order to prevent an effective component of a content fluid from adsorption and penetration. This resin will be described later.

In order to suppress an amount of the resin containing a COP resin as a main component and also to improve brittleness of a welded portion 3 of the discharge port 2, a surface layer 22 of the discharge port 2 to be welded with the multilayered films 11, 12 of the multilayered liquid container is almost constituted of a resin, which includes, as a main component, polyethylene having a density of 880 to 970 kg/m$^3$ and polymerized by use of a metallocene catalyst. On the other hand, a part is constituted of a resin containing a COP resin as a main component so as to secure weldability at the portion 3 being welded.

More particularly, the main part of the surface layer is constituted of a resin including, as a main component, the polyethylene polymerized by use of a metallocene catalyst. In the welded portion 3 wherein the discharge port 2 is welded with the sealants 111, 121 of the multilayered films 11, 12, a part of the resin mainly composed of a COP resin is exposed to the surface of the discharge port 2 in the form of a band running along the end edges of the multilayered films 11, 12. Both at least a part of the resin composed mainly of the COP resin which becomes a subordinate part of the surface layer as exposed and the resin composed mainly of the PE polymerized by use of the metallocene catalyst are welded with the sealants 111, 121 in the form of a band. Accordingly, in FIG. 2 or 3, the band-shaped portion of the resin composed mainly of the COP resin may be depicted as extending toward a side of an accommodation part of the multilayered liquid container (toward a lower side in the figure).

It will be noted that in the present specification, the "main part" of the surface layer of the discharge port means a portion that occupies not less than 50% of the surface area of the surface layer of the discharge port, and the "subordinate part" means a portion that occupies less than 50% of the surface area of the surface layer of the discharge part.

In the welded portion 3 (a portion having a width of I), a portion where the resin composed mainly of the COP resin is exposed at the surface layer 22 of the discharge port 2 (a portion having a width of III) is such that both resin layers at the welded portion are made of the COP resin, resulting in high weld strength. While, this portion is brittle for reasons described in detail hereinafter.

On the other hand, since the band-shaped portion (a portion having a width of II) of the resin mainly composed of the PE polymerized by use of the metallocene catalyst exists, drop impact of the welded portion 3 is absorbed or dispersed with the resin layer of the welded portion (a portion having a width of II). This leads to improved strength against drop impact (drop strength).

More particularly, in the present invention, since the two types of welded portions exist at the welded portion 3, so that weld strength is high and the welded portion 3 of the discharge port 2 can be prevented from breakage, eliminating a concern about a leak.

The layer made of the resin composed mainly of the PE polymerized by use of the metallocene catalyst enables welding with the COP resin of the sealants 111, 121 used for the multilayered films 11, 12 to be high strength irrespective of the layers made of mutually different types of resins. The weld strength obtained is at 30 N/5 mm or over. Moreover, it is enabled to satisfactorily withstand high-temperature sterilization treatment at 105° C. or over.

In order to obtain satisfactory weld strength irrespective of the layers made of mutually different types of resins, importance is placed on the fact that the PE resin polymerized by use of a metallocene catalyst is used as a main component of the surface layer 22 of the discharge port 2.

The PE resins polymerized by use of catalysts other than the metallocene catalyst are wide in molecular weight distribution and contain large quantities of components having low softening points and low molecular weight components. When welded with a COP resin, these components bleed out at a welded face and influence on weldability, thereby causing the weldability to be lowered. On the other hand, when a PE resin is polymerized by use of a metallocene catalyst, low softening point components existing at a welding interface with the PE resin and low molecular weight components bleeding out at the surface of the PE resin to influence on weldability become very small in amount. As a consequence, it is facilitate to establish entanglement between the molecular chains of a COP resin having a molecular structure that is linear and bulky owing to the cyclic hydrocarbon group in the molecular structure and the molecular chains of the PE resin.

If, however, the PE resin is made of a linear low-density polyethylene, α-olefin side chains are appropriately introduced thereinto and thus, the α-olefin side chains readily enter among the molecules, thereby ensuring higher weld strength.

The conditions under which the entanglement of such molecule chains occurs are such that the density is at 880 to 970 kg/m$^3$, preferably at 900 to 960 kg/m$^3$, and more preferably at 935 to 955 kg/m$^3$. It is more preferable to set the density at 935 to 955 kg/m$^3$ since it ensures higher weld strength with the resin composed mainly of a COP resin, as well as improves a heat resistance, making it possible to raise the temperature of the high temperature sterilization treatment at not lower than 115° C. If the density is lower than 880 kg/m$^3$, there may be the case where a heat resistance is insufficient, leading to troubles as deformation of the discharge port when it is sterilized at high temperature. When the density exceeds 970 kg/m³, the weld strength with the resin composed mainly of a COP resin lowers, therefore, although the resulting container may be usable, there may be the case where practical weld strength may not be obtained.

It is to be noted that the resin composed mainly of a COP resin and used for the discharge port 2 is preferably such that a content of a resin component whose number average molecular weight in polystyrene conversion determined by a gel permeation chromatographic analysis using toluene as a solvent is 3,000 or below is at 1 wt % or below, under which neither elution of low molecular weight components nor adsorption of effective components in a medicinal solution occurs. When the number average molecular weight in polystyrene conversion determined by a gel permeation chromatographic analysis using toluene as a solvent is at 10,000 to 200,000, preferably at 20,000 to 100,000 and more preferably at 25,000 to 50,000, excellent mechanical strength and heat resistance are favorably obtained. At the interface between this resin and the resin composed mainly of the PE polymerized by use of a metallocene catalyst, there exist little low softening point components and low molecular weight components, both derived from the resin of the innermost layers 111, 121, so that such entanglement of molecular chains is likely to occur and thus, higher weld strength can be obtained.

In the present invention, the resin composed mainly of the polyethylene polymerized by use of a metallocene catalyst is preferably formulated with HDPE and such a COP resin as set out above within a range of not greater than 40 wt %, preferably not greater than 30 wt %, resulting in an improved heat resistance. In this regard, however, although a greater amount of HDPE or a COP resin results in a more improved heat resistance, an amount of HDPE exceeding 40 wt % may lead to unsatisfactory weld strength with the multilayered film. When an amount of a COP resin exceeds 40 wt %, there may be some cases where the welded portion 3 becomes embrittled and drop strength lowers. Accordingly, when the resin composed mainly of the polyethylene polymerized by a metallocene catalyst contains such a resin within a range of not greater than 40 wt %, preferably not greater than 30 wt %, the temperature of high-temperature sterilization treatment can be made at 121° C. or over even with the case of a resin composed mainly of linear polyethylene.

HDPE, which is to be contained in the resin composed mainly of the polyethylene polymerized by use of a metallocene catalyst, should preferably have a density of 935 to 970 kg/m³, so that an appropriate degree of hardness and a high heat resistance can be imparted to the discharge port 2.

In the present invention, since a portion where the COP resin of the sealants 111, 121 of the multilayered films 11, 12 and the resin of the discharge port 2 composed mainly of a CPO resin are to be welded is exposed in the form of a band at the welded portion 3, the weld strength with the sealants 111, 121 becomes high and stable. For instance, if the welding width is not smaller than 3 mm, there is obtained a weld strength of not less than 30 N/15 mm. From this point of view, the COP resin used as a main component of the sealants 111, 121 is preferably the same as or very similar to a COP resin serving as a main component of the innermost layer 21 of the discharge port 2 although some differences may be involved therein with respect to the film grade or molding grade.

When the sealants 111, 121 of the multilayered films 11, 12 and the surface layer of the discharge port 2 are both made of a COP resin, a weld strength of 30 N/15 mm or over is obtained. However, the COP resin used as a sealant in a container capable of withstanding a high-temperature sterilization treatment suited for the present invention generally has a breaking elongation as small as 3 to 60% and a flexural modulus as high as 2,000 to 3,200 MPa and thus, has very brittle properties when subjected to impact from outside. Hence, when compared with the case where a container sealant is constituted of a material, such as a PE resin used in ordinary containers, which is extended enough to a breaking elongation of 700 to 1,000% and has a flexural modulus of 100 to 700 MPa and is thus flexible, the welded portion 3 of the discharge port 2 is more liable to break when transported after filling of a content fluid, with a concern that a leak may occur. Such a situation cannot be accepted as welding performed substantially at practical weld strength.

In the present invention, the discharge port 2 is arranged in such a way that part of the resin composed mainly of a COP resin to be welded with the multilayered films 11, 12 is exposed at the surface layer of the discharge port 2 in the form of a band along the end edge of the multilayered films 11, 12. At least a part of the resin composed mainly of the COP resin of the exposed outermost layer (surface) and the resin composed mainly of the PE polymerized by use of a metallocene catalyst are welded with the sealants in the form of a band.

In this embodiment, as shown in FIGS. 2 and 3, the discharge port 2 is so formed that there is no resin composed mainly of the PE polymerized by use of a metallocene catalyst at an end portion at the side of the welded portion 2 of the discharge port 2. When the discharge port 2 formed in this way is welded with the multilayered films 11, 12, a content fluid is not put into contact with the resin composed mainly of the PE polymerized with use of a metallocene catalyst in a flow path of the discharge port 2 starting from a content fluid accommodation part of the multilayered liquid container 1. In other words, the contact surface with the content fluid is constituted only of the COP resin, so that the content components are neither adsorbed with the multilayered films 11, 12 and the discharge port 2 nor penetrated into or through the multilayered films 11, 12 and the discharge port 2. Accordingly, this is preferred because the component content in the content fluid does not lower and a content fluid is not degraded or contaminated through interaction with the multilayered films 11, 12 or the discharge port 2.

In the welded portion 3 of the multilayered liquid container 1 of the present invention, although a range of the exposed width is not limited so far as the resin composed mainly of a COP resin is exposed, the exposed width (width III) of the resin composed mainly of a COP resin is within a range of 1 to 20 mm, preferably 2 to 15 mm and more preferably 3 to 10 mm. Although the range of the exposed width may be at smaller than 1 mm, too small a width may impede the molding of the discharge port 2. Although the width may exceed 20 mm, a further improvement of weld strength may not be expected, with some case where such is unfavorable in the viewpoint of cost.

In the welded portion 3, a ratio between the welding width (width II) of the resin composed mainly of the PE polymerized by use of a metallocene catalyst and the welding width (width III) of the resin composed mainly of a COP resin is at 95:5 to 5:95, preferably at 90:10 to 30:70 and more preferably at 80:20 to 60:40. A good balance is obtained thereby between the high weld strength at the welded portion of the COP resin of the sealants 111 121 and the resin composed mainly of a COP resin of the discharge port 2 and the relaxation of brittleness at the welded portion of the COP resin of the innermost layers of the multilayered films 11, 12 and the resin composed mainly of the PE polymerized by use of a metallocene catalyst. In this way, while the weld strength with the discharge port 2 of the multilayered liquid container at the welded portion 3 is kept high, the brittleness at the welded portion is improved. More particularly, the weld strength of not less than 30 N/15 mm based on the resin composed mainly of the COP resin is reflected, thus enabling the resulting multilayered liquid container 1 to become excellent in drop strength.

In this embodiment, no resin composed mainly of the PE polymerized by use of a metallocene catalyst exists in the lower end surface layer of the discharge port 2 at a side of the accommodation part of the multilayered liquid container 1, but only the resin composed mainly of the COP resin is present thereat. This does not permit an effective component of a content fluid to be adsorbed on the multilayered liquid container 1 or to be penetrated through the multilayered, liquid container 1. Hence, the content of the effective component does not lower, or the content fluid is not degraded or contaminated owing to the interaction with the multilayered liquid container 1.

Figure 4:
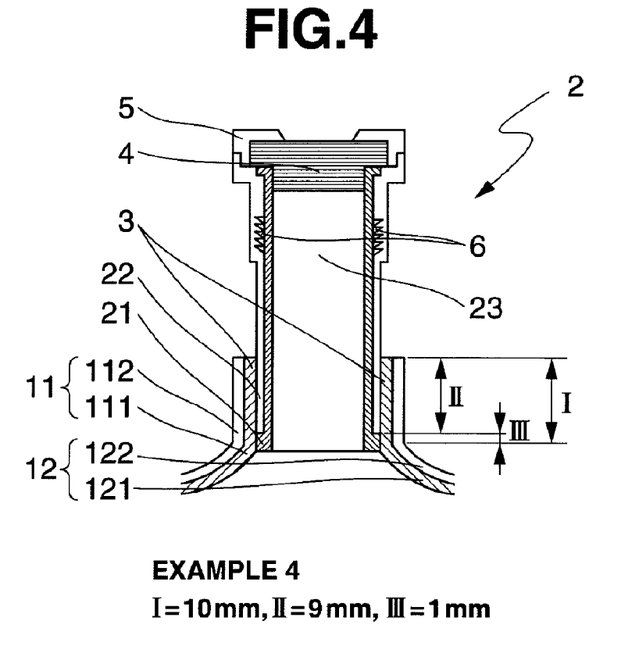
FIG. 4 is a sectional view of the vicinity of a discharge port according to a second embodiment of a multilayered liquid container of the present invention.

FIG. 4 is a sectional view of the vicinity of a discharge port of a multilayered liquid container according to a second embodiment of the present invention. This embodiment differs from the first embodiment only in that recesses and/or projections are provided as shown in FIG. 4.

In the present invention, if the resin used as a main part of the surface layer 22 and composed mainly of the PE polymerized by use of a metallocene catalyst is made of HDPE, MDPE or LDPE alone or its mixing ratio is high, the weld strength between the innermost layer 21 of the discharge port 2 and the resin layer composed mainly of the PE polymerized by use of a metallocene catalyst may not become satisfactory.

In such a case, it is preferred to form recesses and/or projections about the innermost layer 21 at a side of the resin layer composed mainly of the PE polymerized by use of a metallocene catalyst. As shown in FIG. 4, the recesses or projections are preferably those recesses or projections 6 consisting of a plurality of circular recesses or projections although one circular recess or projection may be used. Alternatively, the recesses or projections may not be circular in shape, but mere discontinuous distinct recesses or projections may be randomly provided. Moreover, these may be provided everywhere of the innermost layer 21 at a side of the resin layer made mainly of the PE polymerized by use of a metallocene catalyst. The formation of the recesses or projections 6 can prevent the innermost layer 21 and the resin layer composed mainly of the PE polymerized by use of a metallocene catalyst from peeling and coming off from each other even if the bond strength between the innermost layer 21 of the discharge port 2 and the resin layer composed mainly of the PE polymerized by use of a metallocene catalyst is not satisfactory.

Figure 5:
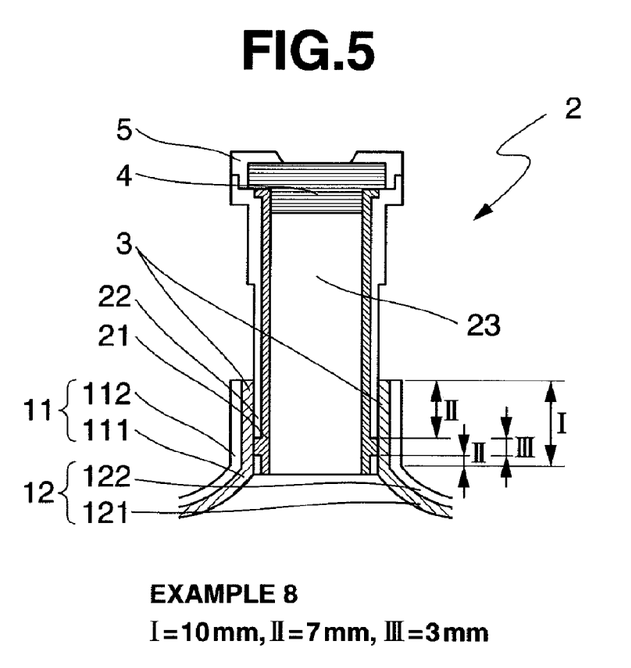
FIG. 5 is a sectional view of the vicinity of a discharge port according to a third embodiment of a multilayered liquid container of the present invention.

FIG. 5 is a sectional view of the vicinity of a discharge port of a multilayered liquid container 1 according to a third embodiment of the present invention. This embodiment differs from the first and second embodiments only in that the multilayered liquid container 1 of this embodiment has a welded portion with the resin layer composed mainly of a COP resin at an intermediate of the welded portion of the discharge port 2.

In this embodiment, the low end surface layer of the multilayered liquid container 1 at a side of an accommodation part is also formed of the resin composed mainly of the PE polymerized by use of a metallocene catalyst. In this case, although the resin layer composed mainly of the PE polymerized by use of a metallocene catalyst at a low end of the discharge port 2 may be in contact with a content fluid, the multilayered films 11, 12 of the multilayered liquid container 1 is in intimate contact with the low end of the discharge port 2 at the welded portion 3, so the influence of the resin composed mainly of the PE polymerized by use of a metallocene catalyst is substantially small. However, when taking it into consideration that the storage period of a multilayered liquid container filled with a content fluid is long, the application to a content fluid that is free of components exerting a great influence of adsorption or penetration is preferred. In this way, if the resin layer composed mainly of a COP resin is exposed to toward the surface layer consisting of the resin layer composed mainly of the PE polymerized by use of a metallocene catalyst, the brittleness of the welded portion based on the resin layer composed mainly of a COP resin is effectively covered with the resin layer composed mainly of the PE polymerized by use of a metallocene catalyst. Accordingly, drop strength is significantly improved and occurrence of through-holes can be effectively prevented.

The COP resins used in the present invention as the sealants 111, 121 of the multilayered films 11, 12 and also as the discharge port 2 include, for example, polymers of a variety of cycloolefin monomers, copolymers of cycloolefin monomers and other types of monomers such as ethylene, and hydrogenated products thereof. The COP resins used for the multilayered films 11, 12 and the discharge port 2 should preferably be substantially the same from each other although there may be some differences such as differences in film grade and molding grade. If welding is possible, different types may be used.

The cycloolefin monomers polymerized to provide COP resins used for the sealants 111, 121 of the multilayered films 11, 12 and the discharge port 2 include, for example: bicyclic cycloolefins such as norbornene, norbornadiene, methyl norbornene, dimethyl norbornene, ethyl norbornene, chlorinated norbornene, chloromethyl norbornene, trimethylsilyl norbornene, phenyl norbornene, cyano norbornene, dicyano norbornene, methoxycarbonyl norbornene, pyridyl norbornene, nadic anhydride, nadic acid imide and the like; tricyclic cycloolefins such as dicylcopentadiene, dihydrodicyclopentadiene, and alkyl, alkenyl, alkylidene and aryl substitutions thereof; tetracyclic cycloolefins such as dimethanohexahydronaphthalene, dimethanooctahydronaphthalene and alkyl, alkenyl, alkylidene and aryl substitutions thereof; pentacyclic cycloolefins such as tricyclopentadiene and the like; and hexacyclic cycloolefins such as hexacycloheptadecene and the like. Additionally, mention is further made of dinorbornene, compounds wherein two norbornene rings are bound through a hydrocarbon chain or an ester group, and norbornene ring-bearing compounds such as alkyl and aryl substitution products thereof.

Of these, polynorbornene resins, which are obtained by polymerizing one or more of norbornene monomers containing a norbornene frame in the molecular structure, such as dicylopentadiene, norbornene, tetracylododecene and the like, hydrogenated products thereof, or blends of two or more thereof are suitable for use as the sealants 111, 121 of the multilayered films 11, 12 and the innermost layer 21 of the discharge port.

It will be noted that the method and mechanism of polymerizing monomer molecules for COP resin in the present invention may be either ring-opening polymerization or addition polymerization. With the addition polymerization, those polymers obtained by use of metallocene catalysts are preferred. With respect to the polymerization method and the structure of the resulting polymer in case where plural types of monomers are used in combination, any known techniques may be used to provide known polymers. Copolymerization may be performed by formulation in the form of monomers, or block copolymers may be provided by formulation after polymerization proceeds to an extent.

Among the COP resins exemplified for used as the sealants 111, 121 and the discharge ports 2 in the invention, those resins represented by the structural formula of the following general formula (1) or (2) are preferred. Of these, the COP resin represented by the following general formula (1) is more preferred because its film-forming property is excellent and the molding of the discharge port 2 can be more inexpensively manufactured. On the other hand, the COP resin represented by the general formula (2) is unable to constitute the sealants 111, 121 of the multilayered films 11, 12 by use of the COP resin alone or to constitute the innermost layer 21 of the discharge port 2, so it is necessary to blend a PE resin for the purpose of improving proccessability. This case should preferably be applied to a content fluid, which is free of a component that is greatly influenced by adsorption or penetration. In addition, a large content of ethylene may lead to shortage of heat resistance.

[Chemical Formula 2]

(wherein $R^1$, $R^2$, $R^3$ and $R^4$ each are a same or different organic group having 1 to 20 carbon atoms, and $R^1$ and $R^2$ and/or $R^3$ and $R^4$ may mutually form a ring, m and p each are an integer of 0, 1 or over, and 1 and n each are an integer of 1 or over).

More particularly, the organic groups having 1 to 20 carbon atoms include, for example: alkyl groups such as methyl, ethyl, n-propyl, i-propyl, n-butyl, i-butyl, sec-butyl, t-butyl, i-pentyl, t-pentyl, n-hexyl, n-heptyl, n-octyl, t-octyl(1,1-dimethyl-3,3-dimethylbutyl), 2-ethylhexyl, nonyl, decyl, undecyl, dodecyl, tridecyl, tetradecyl, pentadecyl, hexadecyl, heptadecyl, octadecyl, nonadecyl, icosyl and the like; cycloalkyl groups such as cyclopentyl, cyclohexyl, cycloheptyl, cyclooctyl and the like; alkylcycloalkyl groups such as 1-methylcyclopentyl, 1-methylcyclohexyl, 1-methyl-4-i-propyl-cyclohexyl and the like; alkenyl groups such as allyl, propenyl, butenyl, 2-butenyl, hexenyl, cyclohexenyl and the like; aryl groups such as a phenyl group, a naphthyl group, a methylphenyl group, a methoxyphenyl group, a biphenyl group, a phenoxyphenyl group, a chlorophenyl group, a sulfophenyl group, and the like; and aralkyl group such as a benzyl group, a 2-phenylethyl group (phenetyl group), an α-methylbenzyl group, an α,α-dimethylbenzyl group and the like although not limited thereto. These may be used singly or in combination of two or more.

The glass transition temperature of these COP resins can be appropriately controlled by proper choice of the values of l, m, n and p or the kind of substituent in the above generals formulas (1) and (2). With respect to the glass transition temperature of COP resins other than those of the above general formulas (1) and (2), they may be arbitrarily controlled by proper choice of the types of monomers, mixing ratio of monomers, monomer sequence, type of substituent and the like.

For the COP resins represented by the general formula (1), commercial products may be used including, for example, Zeonex and Zeonor, both made by Zeon Corporation. As the COP resins represented by the general formula (2), there may be conveniently used commercial products including, for example, APEL made by Mitsui Chemicals Inc., and TOPAS made by Ticona Japan Ltd.

The COP resin used as the sealants 111, 121 of the multilayered films 11, 12 and the discharge port 2 in the present invention is preferably one represented by the general formula (1), and they should more preferably be constituted only of the COP resin represented by the general formula (1) without containing other type of resin.

With the case of the COP resin represented by the general formula (2), it is preferred to blend PE resin or the like at a concentration of about 10 to 40 wt % so as to prevent a gel from generating at the time of film formation. With the COP resin represented by the general formula (2), such a resin that has a small content of ethylene and a large content of a cycloolefin is excellent in heat resistance is thus preferred.

The discharge port 2 is molded by a multimolding using two or more types of resins or by an insert molding. For the molding method, hitherto known methods may be adopted. The discharge port 2 is opened at a tip thereof when a soft bag is manufactured, and a filling nozzle is inserted from an opening 23 to fill a content fluid or subject to nitrogen purge. Thereafter, a rubber stopper body preliminarily fit into a cap 5 having a hole about a rubber stopper 4 is mounted and welded with a ultrasonic sealer or the like for hermetic sealing. When the resin layer composed mainly of the PE polymerized by use of a metallocene catalyst is extended to the tip of the discharge port 2 and exposed and the resin composed mainly of the PE polymerized by use of a metallocene catalyst is used as the cap 5, welding becomes easy, reliable and excellent in cost. This is favorable in that when dropped, the cap made of the PE is able to mitigate the impact and undergoes no breakage. The rubber stopper 4 can be used a well-known rubber stopper as it is, as long as it is a rubber stopper usually used. It is preferred that such a rubber stopper is either one made, for example, of butyl rubber, isoprene rubber, chlorinated butyl rubber silicone rubber used as it is, or a laminated rubber stopper obtained by coating the former with a fluorine resin, ultrahigh molecular weight polyethylene, high molecular weight polyethylene, LLDPE or the like. This is because when the rubber is pinpricked with a needle such as a syringe, it is prevented that part of the rubber stopper 4 is chipped off and incorporated in a content fluid and there can be prevented a problem in that a content fluid is adsorbed on the rubber stopper to cause interaction with the content fluid. The rubber stopper 4 may be made by use of an elastomer resin in place of rubber. This is preferred for the reason that the molding process of the rubber stopper is shortened and the adsorption of fluid content is reduced, so that no lamination is needed with good economy.

The multilayered liquid container 1 of the present invention is employed mainly for accommodating medicinal fluids, so when subjected to high temperature sterilization treatment at not lower than 105° C., preferably not lower than 115° C. and more preferably at not lower than 121° C., the multilayered liquid container 1 should be so configured as not to cause deformation or breakage. In this sense, the COP resins used as both the sealants 111, 121 of the multilayered films 11, 12 and the discharge port 2 should preferably have a glass transition temperature of not lower than 100° C., preferably not lower than 110° C.

EXAMPLES

Examples and Comparative Examples are shown to particularly illustrate the present invention, which should not be construed as limited to the following Examples.

Example 1

Preparation of Multilayered Films 11, 12:

Resin layers having a total thickness of 250 μm and having a lamination of 160 μm thick outermost layers 112, 122 made of a PP elastomer, made by Mitsubishi Chemical Corporation, 30 μm thick adhesive resin layers, not shown, formed of Modic, made by Mitsubishi Chemical Corporation, and 60 μm thick sealants 111, 121 made of a blend of 70% (by weight) of COP resin Zeonor having a glass transition temperature of 102° C. and made by Zeon Corporation and 30% (by weight) of COP resin Zeonex having a glass transition temperature of 136° C. and made by Zeon Corporation were formed according to a water-cooling multilayer inflation technique, thereby providing multilayered films 11, 12 shown in FIG. 2.

Making of Discharge Port 2:

60% (by weight) of COP resin Zeonor having a glass transition temperature of 102° C. and made by Zeon Corporation and 40% (by weight) of COP resin Zeonex having a glass transition temperature of 136° C. and made by Zeon Corporation were blended to provide a resin for an innermost layer 21 of a discharge port 2. Metallocene-based LLDPE (made by Ube-Maruzen Polyethylene Co., Ltd.) having a density of 935 kg/m$^3$ was used singly to provide a resin for the main part of a surface layer of the discharge port 2. The resins for the innermost layer 21 and the main part of the surface layer 22 were lamination molded according to a double molding method to obtain the discharge port 21, shown in FIG. 2, wherein the resin of the innermost layer was exposed at a portion, corresponding to a welded portion 3, of the surface layer at an end side of the discharge port 2. The discharge port was substantially in the form of a cylinder having an overall length of 40 mm and a diameter of 17 mm at a portion corresponding to the welded portion.

Making of Multilayered Liquid Container 1:

One discharge port 2 was sandwiched between the multilayered films 11, 12, followed by welding the peripheral portion thereof to provide a multilayered liquid container 1 shown in FIG. 1 and having a width of 115 mm and a length of 170 mm. The welding was performed in such a way that a width to be welded was 5 mm at both side edges and 3 mm at the narrowest portion and welding conditions included at 260° C. in temperature for 4 seconds at the vicinity of the discharge port 2 and other portions. A hole 7 for suspension with a hook was formed at a side opposite to the discharge port.

Configuration of Welded Portion 3

The welded portion between the multilayered films 11, 12 and the discharge port 2 was so configured as shown in FIG. 2 wherein the total width I of the welded portion 3 was set at 10 mm, the welded width II with the resin composed mainly of the PE polymerized by use of a metallocene catalyst was at 9 mm, and the welded width III with the resin composed mainly of the COP resin was at 1 mm (II:III=90:10).

Measurement of Weld Strength:

For the measurement of weld strength at the welded portion 3 between the multilayered films 11, 12 and the discharge port 2, the discharge port 2 and the multilayered films 11, 12 were cut off from the multilayered liquid container 1. Two cuts spaced at 5 mm were made in the multilayered films 11, 12 at the vicinity of the center of the discharge port 2 in a direction along the flow path to make 5 mm wide free ends of the multilayered films 11, 12, respectively. The 5 mm wide free ends of the multilayered films 11, 12 were, respectively, fixed with chucks of a measuring instrument, followed by measurement by pulling the respective films 11, 12 according to a method described in JIS-Z0238. The measurement was converted in terms of 15 mm.

The results were at 45N/15 mm, revealing very high weld strength.

On the other hand, a similar measurement was carried out at the welded portion between the multilayered films 11, 12 at the side edges thereof. In this regard, however, the side edge welded portion was subjected to measurement after cutting away the welded portion in a direction intersecting at a right angle in a width of 15 mm. The results were such that the weld strength was at 30 N/15 mm.

Drop Impact Test:

100 ml of purified water was packed in the multilayered liquid container from the discharge port 2 and subjected to high temperature sterilization treatment at 115° C. for 40 minutes, followed by storage in an environment of 4° C. for 24 hours. In this condition, the test was carried out by subjecting to free fall from a height of 1.5 m. The drop test was so performed that the discharge port 2 was turned downward so as to invariably have the discharge port 2 fallen to concrete, and the same multilayered liquid container 1 was repeatedly fallen five times. The results revealed that the container had satisfactory drop strength without bag breakage and leak.

Example 2

Preparation of Multilayered Films 11, 12:
Prepared in the same manner as in Example 1.
Making of Discharge Port 2:
Made in the same manner as in Example 1 except that a discharge port 2 shown in FIG. 3 was made.
Making of Multilayered Liquid Container 1:
Made in the same manner as in Example 1.
Configuration of Welded Portion 3:
The total width I of the welded portion 3 was set at 10 mm, the welded width II with the resin composed mainly of the PE polymerized by use of a metallocene catalyst was at 6 mm, and the welded width III with the resin layer 21 composed mainly of the COP resin and used as an innermost layer but exposed to an outermost layer was at 4 mm (II:III=60:40).
Measurement of Welded Strength:
Weld strength of the welded portion 3 was measured in the same manner as in Example 1. The resulting strength was at 42 N/15 mm, exhibiting very high weld strength.

On the other hand, when the welded portion between the side edge portions of the multilayered films 11, 12 was also measured in the same manner as in Example 1, the weld strength was found at 32 N/15 mm.

Drop Impact Test:
The test was conducted in the same manner as in Example 1.

The results revealed that the container had satisfactory drop strength without bag breakage and leak.

Example 3

Preparation of Multilayered Films 11, 12:
Prepared in the same manner as in Example 1.

Making of Discharge Port 2:

Using the same type of COP resin as in Example 1, a COP resin cylinder-shaped molding having a thickness of 1 mm and designated as reference numeral 21 in FIG. 2 was preliminarily injection molded. While formulating HDPE (made by Tosoh Corporation) having a density of 963 kg/m³ in metallocene-based LLDPE (made by Tosoh Corporation) having a density of 930 kg/m³ at a ratio (by weight) of LLDPE:HDPE=80:20 and the cylinder-shaped molding was placed in a mold, followed by coverage of the COP resin cylinder-shaped molding therewith by an insert molding to provide a discharge port 2 shown in FIG. 2 as in Example 1.

Making of Multilayered Liquid Container 1:

Made in the same manner as in Example 1.

Configuration of Welded Portion 3:

Configured in the same manner as in Example 1.

Measurement of Welded Strength:

Welded strength of the welded portion 3 was measured in the same manner as in Example 1. The resulting strength was at 40 N/15 mm, exhibiting very high welded strength.

On the other hand, when the welded portion between the side edge portions of the multilayered films 11, 12 was also measured in the same manner as in Example 1, the welded strength was found at 30 N/15 mm.

Drop Impact Test:

The test was conducted in the same manner as in Example 1.

The results revealed that the container has satisfactory drop strength without bag breakage and leak.

Example 4

Preparation of Multilayered Films 11, 12:

Prepared in the same manner as in Example 1.

Making of Discharge Port 2:

The discharge port 2 was made in the same manner as in Example 1 except that ring-shaped holding projections 6 shown in FIG. 4 were provided at the side of the surface layer 22, which was a resin layer made mainly of the COP resin, of the innermost layer 21.

Making of Multilayered Liquid Container 1:

Made in the same manner as in Example 1.

Configuration of Welded Portion 3:

Configured in the same manner as in Example 1.

Measurement of Welded Strength:

Weld strength of the welded portion 3 was measured in the same manner as in Example 1. The resulting strength was at 35 N/15 mm, exhibiting very high welded strength.

The welded portion between the side edge portions of the multilayered films 11, 12 was also measured in the same manner as in Example 1, revealing that the weld strength was at 30 N/15 mm.

Drop Impact Test:

The test was conducted in the same manner as in Example 1.

The results revealed that the container has satisfactory drop strength without bag breakage and leak.

Example 5

Preparation of Multilayered Films 11, 12:

Prepared in the same manner as in Example 1.

Making of Discharge Port 2:

Insert molding was performed in the same way as in Example 3 except that metallocene-based LLDPE (made by Ube-Maruzen Polyethylene Co., Ltd.) having a density of 935 kg/m³ and used in Example 1 was employed as a resin for the main part of the surface layer 22 to provide a discharge port 2 shown in FIG. 2.

Making of Multilayered Liquid Container 1:

Made in the same manner as in Example 1.

Configuration of Welded Portion 3:

Configured in the same manner as in Example 1.

Measurement of Welded Strength:

Weld strength of the welded portion 3 was measured in the same manner as in Example 1. The resulting strength was at 44 N/15 mm, exhibiting very high welded strength.

On the other hand, the welded portion between the side edge portions of the multilayered films 11, 12 was also measured in the same manner as in Example 1, revealing that the weld strength was at 30 N/15 mm.

Drop Impact Test:

The test was conducted in the same manner as in Example 1.

The results revealed that the container has satisfactory drop strength without bag breakage and leak.

Example 6

Preparation of Multilayered Films 11, 12:

Multilayered films 11, 12 shown in FIG. 2 and having a total thickness of 250 μm were formed according to a multilayer T-die coextrusion technique by laminating: 15 μm of outermost layers 112, 122 made of HDPE (made by Tosoh Corporation) having a density of 936 kg/m³;

150 μm of a first intermediate layer, not shown, adjacent to the outermost layers 112, 122 and made of LLDPE (made by Prime Polymer Co., Ltd.) having a density of 925 kg/m³;

25 μm of a second intermediate layer, not shown, made of LLDPE (made by Japan Polyethylene Corporation) having a density of 910 kg/cm³ and adjacent to the first intermediate layer and sealants 111, 121, respectively; and 60 μm of sealants 111, 121 made of a blend of 60% (by weight) of COP resin Zeonor having a glass transition temperature of 102° C. and made by Zeon Corporation and 40% (by weight) of COP resin Zeonex having a glass transition temperature of 136° C. and made by Zeon Corporation.

Making of Discharge Port 2:

Made in the same manner as in Example 3.

Making of Multilayered Liquid Container 1:

Made in the same manner as in Example 1.

Configuration of Welded Portion 3:

Configured in the same manner as in Example 1.

Measurement of Welded Strength:

Weld strength of the welded portion 3 was measured in the same manner as in Example 1. The resulting strength was at 40 N/15 mm, exhibiting very high welded strength.

On the other hand, the welded portion between the side edge portions of the multilayered films 11, 12 was also measured in the same manner as in Example 1, revealing that the weld strength was at 33 N/15 mm.

Drop Impact Test:

The test was conducted in the same manner as in Example 1 except that sterilization was carried out at 121° C. for 30 minutes.

The results revealed that the container has satisfactory drop strength without bag breakage and leak.

Example 7

Preparation of Multilayered Films 11, 12:

Prepared in the same manner as in Example 6.

Making of Discharge Port 2:

Made in the same manner as in Example 1.
Making of Multilayered Liquid Container 1:
   Made in the same manner as in Example 1.
Configuration of Welded Portion 3:
   Configured in the same manner as in Example 1.
Measurement of Welded Strength:
   Weld strength of the welded portion 3 was measured in the same manner as in Example 1. The resulting strength was at 42 N/15 mm, exhibiting very high welded strength.
   On the other hand, the welded portion between the side edge portions of the multilayered films 11, 12 was also measured in the same manner as in Example 1, revealing that the weld strength was at 33 N/15 mm.
Drop Impact Test:
   The test was conducted in the same manner as in Example 1.
   The results revealed that the container has satisfactory drop strength without bag breakage and leak.

Example 8

Preparation of Multilayered Films 11, 12:
   Multilayered films 11, 12 shown in FIG. 5 and having a total thickness of 250 μm were formed according to a multilayer T-die coextrusion technique by laminating 40 μm of outermost layers 112, 122 made of LLDPE (made by Tosoh Corporation) having a density of 935 kg/m$^3$, 150 μm of an intermediate layer, not shown, made of a blend of LLDPE (Prime Polymer Cp., Ltd.) having a density of 925 kg/m$^3$ and LLDPE (made by Japan Polyethylene Corporation) having a density of 905 kg/m$^3$ at the ratio of 9:1 (by weight), and 60 μm of sealants 111, 121 made of a blend of 60% (by weight) of COP resin Zeonor having a glass transition temperature of 102° C. and made by Zeon Corporation and 40% (by weight) of COP resin Zeonex having a glass transition temperature of 136° C. and made by Zeon Corporation.
Making of Discharge Port 2:
   Made in the same manner as in Example 1.
Making of Multilayered Liquid Container 1:
   Made in the same manner as in Example 1.
Configuration of Welded Portion 3:
   Configuration of Welded Portion 3:
   The welded portion 3 of the multilayered films 11, 12 and the discharge port 3 was embodied as shown in FIG. 5. A total width I of the welded portion 3 was 10 mm, and a welded portion with a resin made mainly of a COP resin was provided at the intermediate with the welded portion 3 with its width III being set at 3 mm. The welded width II with a resin made mainly of the PE polymerized by use of a metallocene catalyst was vertically divided into 5 mm and 2 mm as is particularly shown in FIG. 5, thus being 7 mm in total=70:30).
Measurement of Welded Strength:
   Weld strength of the welded portion 3 was measured in the same manner as in Example 1. The resulting strength was at 45 N/15 mm, exhibiting very high welded strength.
   On the other hand, the welded portion between the side edge portions of the multilayered films 11, 12 was also measured in the same manner as in Example 1, revealing that the weld strength was at 30 N/15 mm.
Drop Impact Test:
   The test was conducted in the same manner as in Example 1.
   The results revealed that the container has satisfactory drop strength without bag breakage and leak.

Comparative Example 1

Preparation of Multilayered Films:
   Prepared in the same manner as in Example 1.
Making of Discharge Port:
   Made same as the discharge port 1 except that the resin made mainly of the COP resin of the innermost layer 21 was laminated as not exposed at the surface layer 22. Making of multilayered liquid container:
   Made in the same manner as in Example 1.
Configuration of Welded Portion 3:
   Configured in the same manner as in Example 1 except that all the welded portion of the multilayered films and the discharge port were welded with the resin of the outermost layer 22 made mainly of the PE polymerized by use of a metallocene catalyst.
Measurement of Welded Strength:
   Weld strength of the welded portion 3 was measured in the same manner as in Example 1. The resulting strength was at 21 N/15 mm and was thus low.
   On the other hand, the welded portion between the side edge portions of the multilayered films was similarly measured, revealing that the weld strength was at 30 N/15 mm.
Drop Impact Test:
   The test was conducted in the same manner as in Example 1.
   The results revealed that no bag breakage and leak occurred at the first drop, but leak from a peripheral edge portion of the discharge port was observed at the third drop.

Description of Reference Numerals

1 Multilayered liquid container
11, 12 Multilayered films
111, 121 Sealants of multilayered films
2 Discharge port
21 Innermost layer of discharge port
22 Surface layer of discharge port
3 Welded portion
4 Rubber stopper
5 Cap
6 Recess and projection
7 Hole

The invention claimed is:

1. A multilayered liquid container, which is made of a multilayered film wherein a sealant of a resin comprising a cycloolefin resin as a main component is laminated on one side thereof and has, at a part of the container, at least one discharge port having a laminate structure at a section intersecting with a discharge path at a right angle, characterized in that:
   an innermost layer forming the discharge path of said discharge port is constituted of a resin comprising a cycloolefin resin as a main component, and a main part of a surface layer is constituted of a resin comprising, as a main component, polyethylene polymerized by use of a metallocene catalyst; and
   in a welded portion wherein the discharge port is welded with the sealant, a part of the resin comprising, as a main component, the cycloolefin resin in the innermost layer of said discharge port is exposed at the surface layer of said discharge port in the form of a band along an end edge of said multilayered film and both at least a part of the resin left as a subordinate part of the surface layer and comprising the cycloolefin resin as a main component and the resin left as a main part of the surface layer and comprising, as a main component, the polyethylene polymerized by use of the metallocene catalyst are welded with said sealant in the form of a band.

2. The multilayered liquid container as defined in claim 1, characterized in that the resin comprising, as a main component, the polyethylene polymerized by use of the metallocene catalyst is absent at the surface layer existing at an end portion of the welded portion side of said discharge port.

3. The multilayered liquid container as defined in claim 1 or 2, wherein in said welded portion, a ratio between a welded width of the resin comprising, as a main component, the polyethylene polymerized by use of the metallocene catalyst and a welded width of the resin comprising the cycloolefin resin as a main component is at 95:5 to 5:95.

4. The multilayered liquid container as defined in claim 1, characterized in that the polyethylene polymerized by use of said metallocene catalyst is a linear polyethylene whose density is at 880 to 970 kg/m$^3$.

5. The multilayered liquid container as defined in claim 1, characterized in that the resin used for said discharge port and comprising, as a main component, the polyethylene polymerized by use of said metallocene catalyst is made singly of a polyethylene polymerized by use of the metallocene catalyst or is made of a mixture of the polyethylene polymerized by use of the metallocene catalyst and a cycloolefin resin, a medium density polyethylene or a high density polyethylene.

6. The multilayered liquid container as defined in claim 5, characterized in that the resin used for said discharge port and comprising, as a main component, the polyethylene polymerized by use of the metallocene catalyst contains a high density polyethylene having a density of 935 to 970 kg/m$^3$ within a range of amount not larger than 40 wt %.

7. The multilayered liquid container as defined in claim 1, characterized in that in the resin used as the innermost layer of said discharge port and comprising the cycloolefin resin as a main component, a content of a resin component whose number average molecular weight in polystyrene conversion is not larger than 3,000 is at not larger than 1 wt % when determined by gel permeation chromatography using toluene as a solvent.

8. The multilayered liquid container as defined in claim 1, wherein the cycloolefin resin in the resin comprising the cycloolefin resin as a main component and used for the innermost layer of said discharge port is represented by the following general formula (1) and/or (2)

[Chemical Formula 1]

(wherein R$^1$, R$^2$, R$^3$ and R$^4$ each are a same or different organic group having 1 to 20 carbon atoms, and R$^1$ and R$^2$ and/or R$^3$ and R$^4$ may mutually form a ring, m and p each are an integer of 0, 1 or over, and 1 and n each are an integer of 1 or over).

9. The multilayered liquid container as defined in claim 1, wherein in the laminate structure of said discharge port, recess and/or projection portions are formed on the resin layer comprising, as a main component, the cycloolefin resin at a side of the resin layer composed mainly of the polyethylene polymerized by use of the metallocene catalyst.

10. The multilayered liquid container as defined in claim 1, wherein a cap provided with a rubber stopper is welded to said discharge port.

11. The multilayered liquid container as defined in claim 1, wherein said container enables high-temperature sterilization treatment of not lower than 105° C.

\* \* \* \* \*